United States Patent [19]

Ikeda et al.

[11] Patent Number: 5,418,955
[45] Date of Patent: May 23, 1995

[54] INITIALIZATION SYSTEM FOR A CLOSE-COUPLED MULTIPROCESSOR SYSTEM

[75] Inventors: Kazuhiko Ikeda, Yamato; Satoru Sakai, Kawasaki, both of Japan

[73] Assignees: Fujitsu Limited, Kawasaki; PFU Limited, Ishikawa, both of Japan

[21] Appl. No.: 791,407

[22] Filed: Nov. 14, 1991

[30] Foreign Application Priority Data

Nov. 14, 1990 [JP] Japan .................................. 2-306082

[51] Int. Cl.6 .............................................. G06F 15/60
[52] U.S. Cl. .................................... 395/700; 395/650; 364/DIG. 2
[58] Field of Search ................. 395/650, 700; 371/9.1, 371/11.3

[56] References Cited

U.S. PATENT DOCUMENTS

| | | | |
|---|---|---|---|
| 4,358,823 | 11/1982 | McDonald et al. | 364/200 |
| 4,484,273 | 11/1984 | Stiffler et al. | 364/200 |
| 4,718,002 | 1/1988 | Carr | 364/200 |
| 4,757,442 | 7/1988 | Sakata | 364/200 |
| 4,951,192 | 8/1990 | Chase, Jr. et al. | 364/200 |
| 5,041,966 | 8/1991 | Nakai et al. | 364/200 |

OTHER PUBLICATIONS

Triebel & Singh The 8086 Microprocessor Prentice-Hall, 1985, p. 9.

*Primary Examiner*—Thomas G. Black
*Assistant Examiner*—Peter Y. Wang
*Attorney, Agent, or Firm*—Staas & Halsey

[57] ABSTRACT

In an initialization system for a close-coupled multiprocessor system. The initialization system includes a plurality of processors and one main memory connected to the processors through a system bus, and the initialization system connected to the processors through the system bus. The initialization system includes a first storage for storing identification (ID) codes each corresponding to the processor, one of ID codes being designated as a master processor, and other ID codes having a priority for designating the next master processor and a second storage for storing a first program to initialize the system and a second program to supervise an initialization time. In addition, the initialization system includes a first information unit for informing of the start of operation of the processors and a second information unit for informing of the completion of initialization of the master processor.

6 Claims, 4 Drawing Sheets

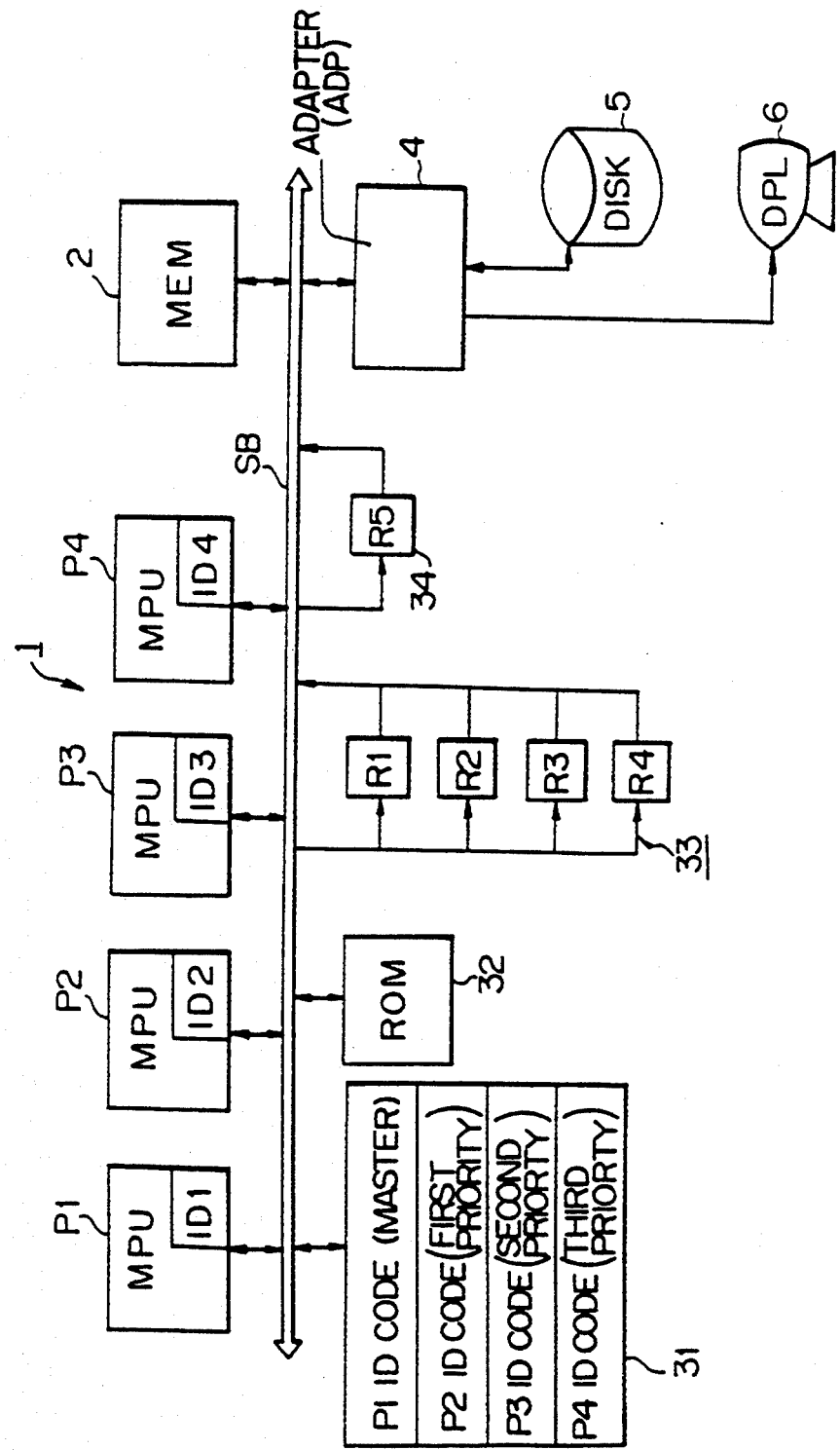

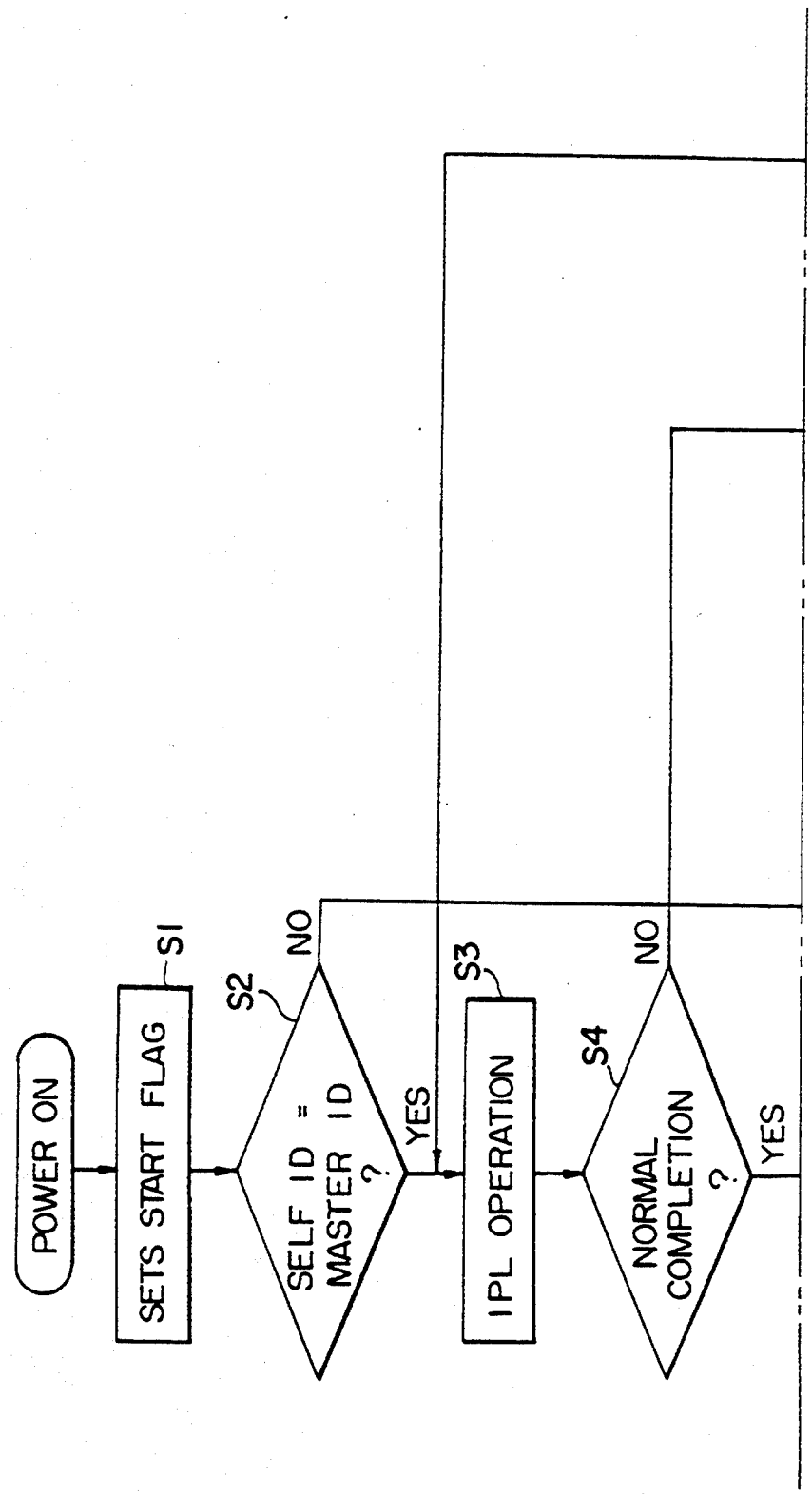

INITIALIZATION SYSTEM FOR A CLOSE-COUPLED MULTIPROCESSOR SYSTEM

BACKGROUND OF THE INVENTION

1. Field of the Invention

The present invention relates to an initialization system for a close-coupled multiprocessor system which includes a plurality of processors and one main memory connected to the processors through a system bus.

2. Description of the Related Art

Recently, a multiprocessor system is widely used in the field of a computer system. In general, there are two kinds of multiprocessor systems, i.e., close-coupled type and coarse-coupled type. The former has one main memory used in common for all processors, and the latter has a plurality of memories each connected to the processor. The present invention relates to the close coupled multiprocessor system.

In the close-coupled multiprocessor system, any one of the processors (i.e., so-called master processor) runs an initial program loading (IPL) operation when setting up the system, and other processors wait until the IPL operation is completed. After the IPL operation is normally completed by the master processor, the system can operate.

Conventionally, the processor that becomes the master processor has been previously determined by a computer maker. Accordingly, if a fault accidentally occurs in the master processor, the IPL operation can not be completed so that the system can not operate. In this case, since other processors must wait until the master processor is recovered, it is impossible to immediately constitute a new system based on other processors other than the master processor.

Accordingly, the present invention relates to an initialization system for the close-coupled multiprocessor system, and the initialization system can immediately set up the system by designating a new master processor from other processors when the fault occurs accidentally in the master processor in the IPL operation.

SUMMARY OF THE INVENTION

The object of the present invention is to provide an initialization system for a close-coupled multiprocessor system enabling immediate set-up of the system by other processors when the fault occurs accidentally in the master processor in the IPL operation.

In accordance with the present invention, there is provided an initialization system for a close-coupled multiprocessor system, which includes a plurality of processors, one main memory connected to the processors through a system bus, and an initialization system connected to the processors through the system bus. The initialization system includes a first storage for storing identification (ID) codes each corresponding to the processor, one of ID codes being designated as a master processor, and other ID codes having a priority for designating the next master processor; a second storage for storing a program to initialize the system and a program to supervise an initialization time; a first information unit for informing of the start of an operation of the processors; and a second information unit for informing of the completion of initialization of the master processor.

In the preferred embodiment, the first storage includes a non-volatile memory for storing ID codes each corresponding to the ID code of the processor. One of the ID codes is designated as the master processor and other ID codes have a priority to designate the next master processor should the current master processor fail.

In the preferred embodiment, the second storage includes a read only memory (ROM) for storing an initialization program to initialize the system and a supervisory program for supervising initialization time of the master processor.

In the preferred embodiment, the first information unit includes registers each corresponding to the processor, and each register stores a flag indicating the start of operation of all processors.

In the preferred embodiment, the second information unit includes a register, and the register stores a congestion flag indicating completion of initialization by the master processor.

In the preferred embodiment, the completion flag is turned ON in the register when the initialization operation is normally completed by the master processor, other processors supervise this completion flag, and when the completion flag is not turned ON after a predetermined initialization time, one of the other processors having the highest priority become the next master processor instead of the first master processor.

BRIEF DESCRIPTION OF THE DRAWINGS

In the drawings:

FIG. 2 is a detailed block diagram of the close-coupled multiprocessor system shown in FIG. 1; and FIG. 3A and 3B are flowcharts for explaining operation of the initialization system shown in FIG. 2.

DESCRIPTION OF THE PREFERRED EMBODIMENTS

Figure 1:
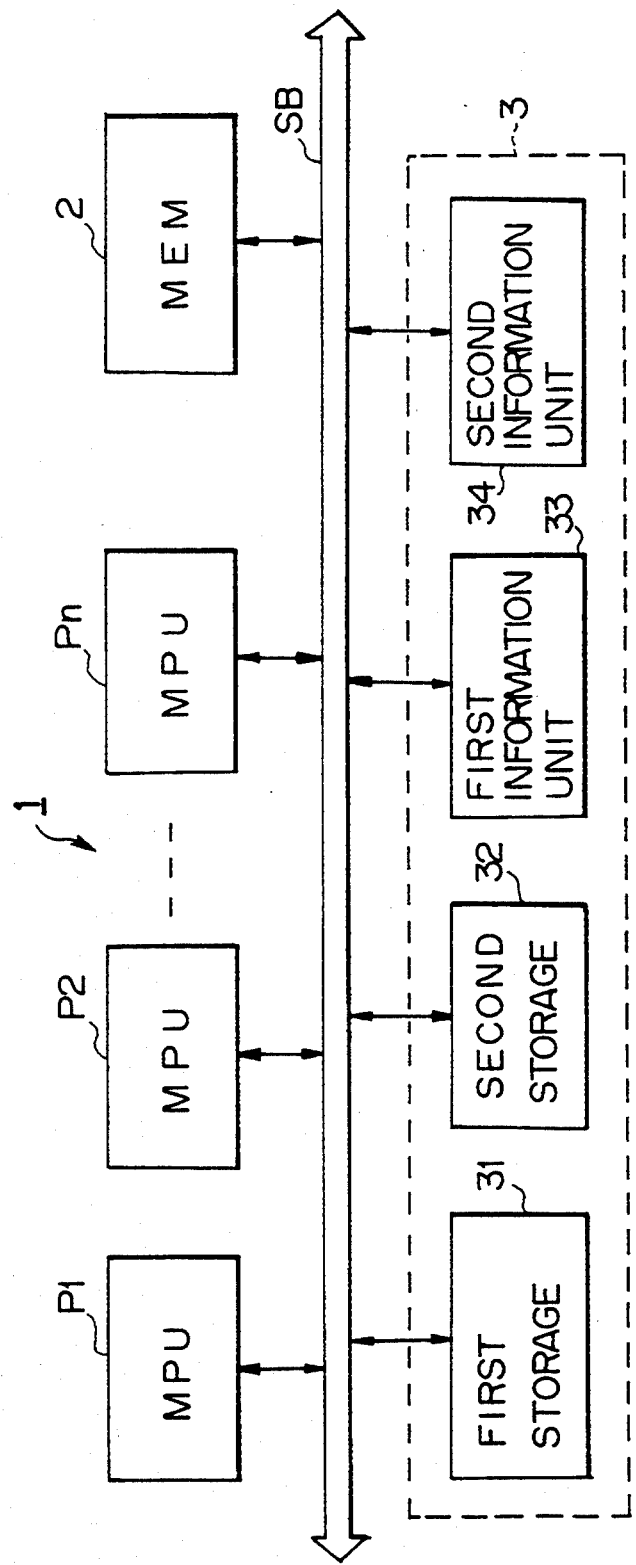
FIG. 1 is a schematic block diagram of a close-coupled multiprocessor system having an initialization system according to the present invention.

FIG. 1 is a schematic block diagram of close-coupled multiprocessor system having an initialization system according to the present invention. In FIG. 1, reference number 1 denotes processors (MPU), 2 a storage (MEM), 3 an initialization system, and SB a system bus. The close-coupled multiprocessor system 1 includes a plurality of processors P1 to Pn and the main memory 2 connected to the processors P1 to Pn through the system bus SB. Further, the initialization system 3 according to the present invention is connected to the processors P1 to Pn through the system bus SB.

The initialization system 3 according to the present invention includes: a first storage 31 for storing identification (ID) codes each corresponding to the processor, one of ID codes designated as a master processor, and other ID codes having a priority for designating the next master processor; a second storage 32 for storing a program to initialize the system and a program to supervise an initialization time; a first information unit 33 for informing of the start of operation of the processors; and a second information unit 34 for informing of the completion of initialization of the master processor.

FIG. 2 is a detailed block diagram of the close-coupled multiprocessor system shown in FIG. 1. In FIG. 2, reference number 4 denotes an adaptor (ADP), 5 an external storage device (DISK), and 6 a display device (DPL). The external storage device 5 stores a system program. The adaptor 4 is used for controlling the read of the system program from the external storage device 5 and write into the memory 2. Each processor P1 to P4 has a respective register ID1 to ID4 for storing the ID code of its own processor (below, self ID code).

The first storage 31 has, for example, a non-volatile memory for storing ID codes each corresponding to the ID code of each processor. In this case, one of the ID codes is designated as the master processor (master ID code) and other ID codes have a priority to designate the next master processor. For example, when the processor P1 is designated as the master, the priority of other processors P2 to P4 is given by P2>P3>P4. Accordingly, when the fault occurs in the processor P1 in the IPL operation, the processor P2 is designated as the master processor as explained in detail below.

Figure 3B:
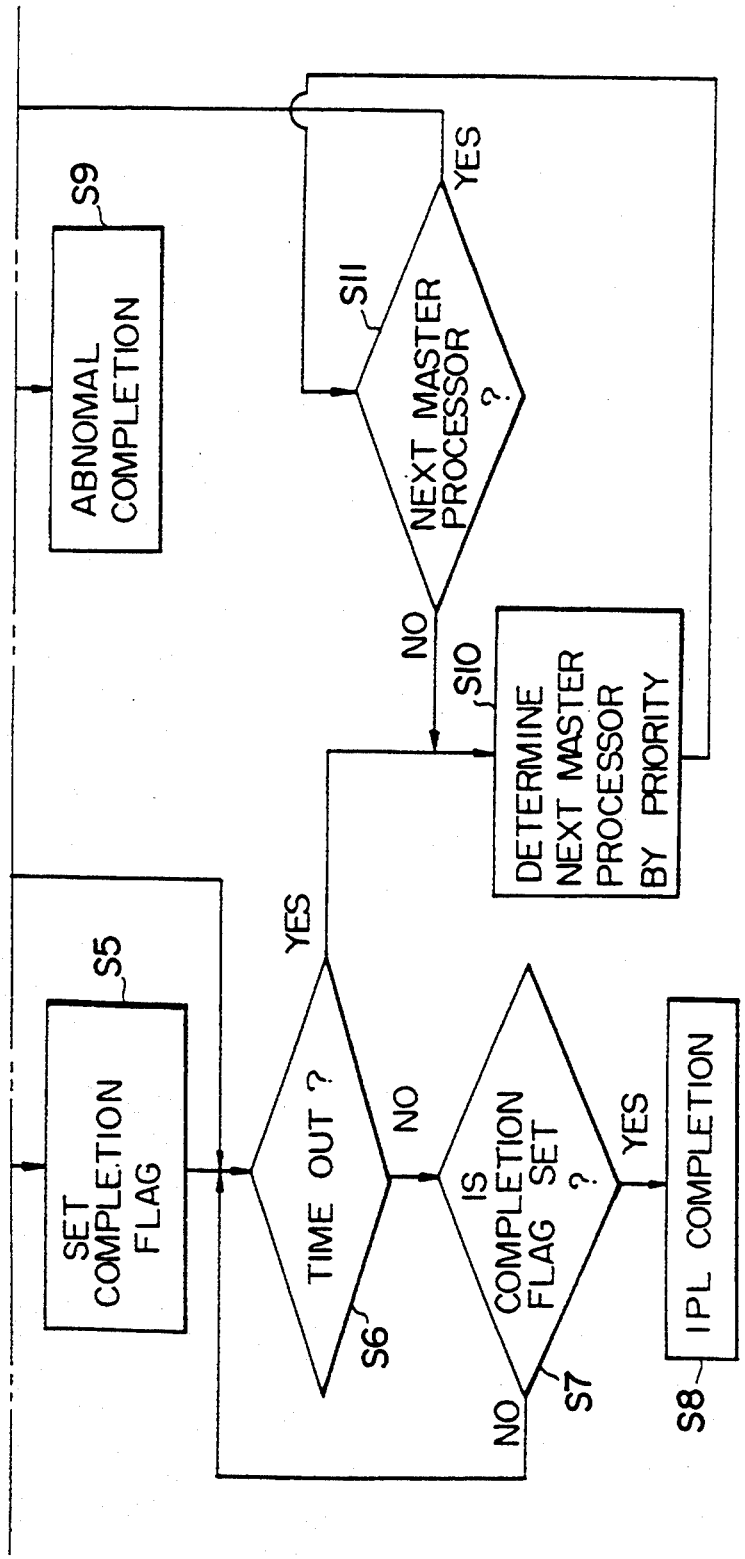

The second storage 32 has, for example, a read only memory (ROM) for storing an initialization program to initialize the system. The initialization program is shown in FIG. 3. The ROM further includes a supervisory program for supervising initialization time of the master processor and a flag for indicating completion of the initialization.

The first information unit 33 has, for example, registers R1 to R4 each corresponding to the processor P1 to P4. Each register R1 to R4 stores a flag indicating the start of an operation (start flag). In this system, all start flags (when all processors are normal or in operation) are turned ON when the system is set up.

The second information unit 34 has, for example, a register R5. The register R5 stores a flag indicating completion of the initialization by the master processor (completion flag). When the initialization operation is normally completed by the master processor P1, the completion flag is turned ON in the register R5. As explained below, other processors P2 to P4 supervise this completion flag. If the completion flag is not turned ON after a predetermined initialization time, one of other processors having the highest priority becomes the master processor instead of the master processor P1.

FIG. 3 is a flowchart for explaining operation of the initialization system shown in FIG. 2. This flowchart is stored in the ROM 32 as the initialization program. When the power is turned ON or the system is set up, all processors set the start flag in the corresponding register R1 to R4 in the first information unit 33 (step S1). Next, each processor P1 to P4 compares the self ID code with the ID codes in the non-volatile memory 31, and determines whether or not the self ID code coincides with the master ID code (step S2). When the self ID code coincides with the master ID code (YES), the master processor P1 runs the IPL operation (step S3). Further, the master processor P1 determines whether or not the IPL operation is normally completed (step S4). When the IPL operation is normally completed (YES), the master processor P1 sets the completion flag in the register R5 of the second information unit 34 (step S5). Further, in step S4, the master processor P1 reads the system program stored in the DISK 5 and stores it into the memory 2 through the adaptor 4. However, when a fault occurs in other devices, for example, the adaptor 4, the DISK 5 and the display 6, the system is down as an abnormal failure (step S9).

Meanwhile, other processors P2 to P4 supervise the completion flag of the master processor P1 based on the initialization time of the master processor P1 (step S6). The initialization time is determined by the time necessary for initializing the system. When the completion flag of the second information unit 34 is not turned ON within a predetermined supervisory time, that is, the initialization time is longer than the predetermined supervisory time (YES), since the fault occurs in the master processor P1, any other processor having the highest priority becomes a new master processor (step S10).

Next, the new master processor, for example, the processor P2 determines whether or not the self ID code coincides with the ID code having the highest priority (step S11). When the self ID code coincides with the ID code (YES) as the master processor, the IPL operation of the master processor P2 restarts from step S3. When the self ID code of the master processor P2 does not coincide with the ID code having the highest priority, any other processor having the next priority becomes the new master processor in step S10.

Further, other processors P3 and P4 supervise the completion flag of the master processor P2 during initialization time thereof. When the initialization time is not over (NO, in step S6) and the completion flag turned ON (YES, in step S7), this means that the IPL operation by the master processor P2 is completed (step S8).

Still further, when the fault occurs in the processor P2, the other processor having the next priority, for example, the processor P3 performs the same operation of the initialization as explained above from the steps S10 and S11. Accordingly, even if a fault occurs in any of the processors, it is possible to quickly set up the system.

In other embodiments, it is possible to use a dipswitch instead of the non-volatile memory 31. The dipswitch has a plurality of ON/OFF contacts. Accordingly, it is possible to designate the master ID code based on the ON state of the contact.

We claim:

1. An initialization system for a close-coupled multiprocessor system which includes a plurality of processors and one main memory connected to the plurality of processors through a system bus, and said initialization system being connected to the plurality of processors through the system bus and initializing the close-coupled multiprocessor system, said initialization system comprising:

a first storage connected to the system bus and storing identification codes corresponding to each of the plurality of processors, one of the identification codes designating one of the plurality of processors as a master processor, and other of the identification codes having priorities for designating other of the plurality of processors as next master processors, one of said next master processors being designated as the master processor, based on the priorities, if the master processor experiences an abnormality;

a second storage connected to the system bus storing a first program executed by the master processor to initialize the close-coupled multiprocessor system and a second program executed by the next master processors to monitor an initialization of the master processor and to determine whether the initialization of the master processor was completed within an initialization time, which is a predetermined time allowed for the initialization;

first information means connected to the system bus and comprising first flags, each first flag corresponding to one of the plurality of processors, said first information means for informing the plurality of processors of a beginning of initialization of each of the plurality of processors by setting each of the first flags; and second information means connected to the system bus and comprising second flags, each second flag corresponding to one of the plurality of processors, said second information means for informing the plurality of processors that the initialization of the master processor or one of the next master processors has been completed by setting each of the second flags.

2. An initialization system as claimed in claim 1, wherein the first storage comprises a nonvolatile memory for storing storage identification codes each corresponding to the identification codes of each of the plurality of processors, one of the storage identification codes designating the one of the plurality of processors as the master processor and other of the storage identification codes having storage priorities designating the next master processors.

3. An initialization system as claimed in claim 1, wherein the second storage comprises a read only memory for storing an initialization program to initialize the close-coupled multiprocessor system and a supervisory program for supervising the initialization time of the master processor.

4. An initialization system as claimed in claim 1, wherein the first information means comprises registers corresponding to each of the plurality of processors, and each of the registers storing the first flags indicating the starting operating of all of the plurality of processors.

5. An initialization system as claimed in claim 1, wherein the second information means comprises an information register, and the information register storing one of the second flags indicating completion of the initialization by the master processor.

6. An initialization system as claimed in claim 5, wherein the one of the second flags is turned ON in the information register when the initialization operation is completed by the master processor, the other of the plurality of processors supervising the one of the second flags, and when the one of the completion flags is not turned ON after the predetermined time allowed for the initialization, one of the other of the plurality of processors having a highest priority of the priorities replaces the master processor as a new master processor.

* * * * *

UNITED STATES PATENT AND TRADEMARK OFFICE
CERTIFICATE OF CORRECTION

PATENT NO. : 5,418,955
DATED : May 23, 1995
INVENTOR(S) : Kazuhiko IKEDA

It is certified that error appears in the above-indentified patent and that said Letters Patent is hereby corrected as shown below:

Title Page [56] References Cited line 3, after "Stiffler et al. . . . 364/200 insert --4,596,012 6/1986 Reed . . . 370/85;

line 7, after "Nakai et al. . . . 364/200" insert the following

--FOREIGN DOCUMENTS

| | | |
|---|---|---|
| 63262747 | 2/1989 | Japan |
| 6383856 | 8/1988 | Japan |
| 63104167 | 9/1988 | Japan--. |

Signed and Sealed this

Nineteenth Day of September, 1995

Attest:

BRUCE LEHMAN

*Attesting Officer*  *Commissioner of Patents and Trademarks*